Aug. 20, 1929.  W. O. SWANSON ET AL  1,725,548

AUTOMATIC TRAILER BRAKE

Filed Aug. 29, 1927

Inventor
William O. Swanson
William F. Swanson

By Adam E. Fisher.
Attorney

Patented Aug. 20, 1929.

1,725,548

UNITED STATES PATENT OFFICE.

WILLIAM O. SWANSON AND WILLIAM F. SWANSON, OF NEOSHO, MISSOURI.

AUTOMATIC TRAILER BRAKE.

Application filed August 29, 1927. Serial No. 216,106.

This invention relates to automatic brakes for wheeled trailers, and the object is to provide a self regulating brake mechanism for a wheeled trailer, which will automatically operate to brake the vehicle in going down a grade and so relieve the tractor vehicle of the dead weight of the trailer.

In the drawing

Figure 1:
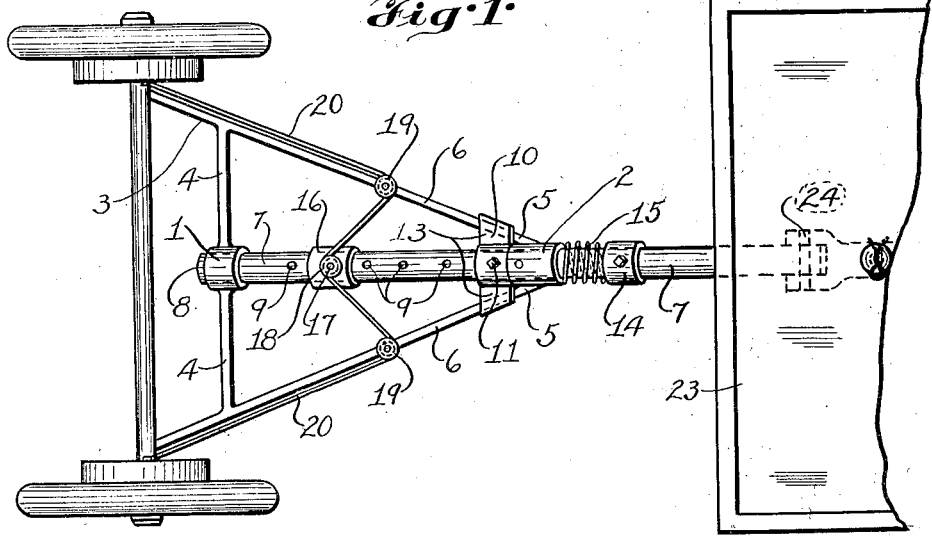
Figure 1 is a plan view of a trailer chassis, embodying this invention, showing also in plan a section of the tractor vehicle to which the trailer is attached.
Figure 2:
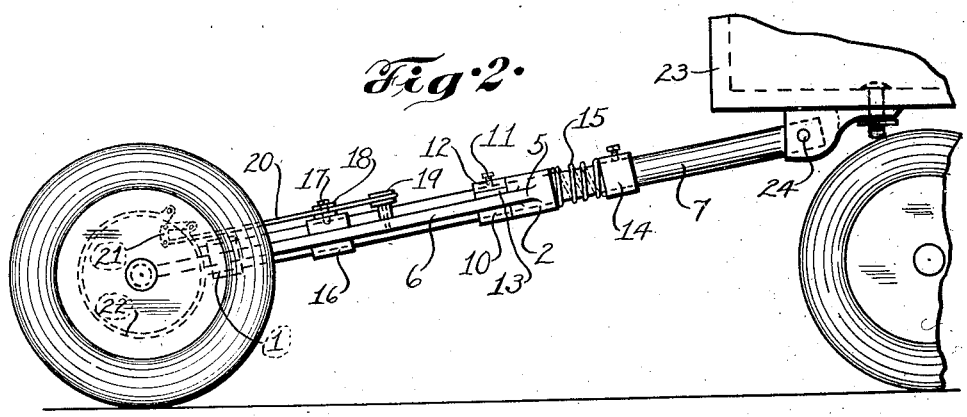
Figure 2 is a side elevation of the assembly shown in Figure 1.

In carrying out this invention we mount two equal tongue sleeves or collars 1 and 2 in longitudinal alignment upon the hounds of the trailer chassis 3, the same being arranged upon the longitudinal center line of the chassis as a whole, the rear collar 1 being rigidly incorporated in the cross bar 4, or rigidly secured thereto, and the forward collar 2 being likewise rigidly secured to the forward meeting ends 5 of the hounds 6, the said collar 2 forming in fact a junction for the said hounds. A conventional form of round tongue 7 is provided, of a diameter neatly and slidably to engage the collars 1 and 2 and is passed through said collars, with the rear end 8 protruding substantially through the rear collar 1. The tongue 7 is pierced with the series of coupling pin holes 9. An adjustable draw or pull collar 10 is slidably mounted upon the tongue 7 immediately back of the forward collar 2, but is adapted to be locked in any one of the several locations demarked along the tongue 7 by the holes 9, by means of a coupling pin 11 loosely passed through the pin hole 12 formed through the collar 10, and through any one of the said holes 9 of the tongue. Thus a forward pull upon the tongue 7 will draw the pull collar 10 up against the fixed collar 2, and thus draw the vehicle 3 as a whole. The collar 10 is provided with lateral wings or guides 13 adapted to slidably bear upon the hounds 6, thereby preventing the turning or twisting of the tongue 7 within the collars 1 and 2. A shock collar 14 is locked upon the tongue 7 forwardly of and spaced from the collar 2, and a coiled shock spring 15 is mounted over the tongue 7 between these collars 2 and 14. A tension adjusting brake collar 16 is adjustably mounted upon the tongue 7 by means of a pin 17 passing through the collar and one of the holes 9. The upper end or head of the pin 17 has journaled thereupon a pulley 18, and similar pulleys 19 are mounted laterally upon the hounds 6, the pulleys 19 being located somewhat forwardly of the pulley 18. A cable 20 is secured by its ends to the brake levers 21 of the brakes 22 and is then passed forwardly over the two pulleys 19 and rearwardly over the pulley 18. The forward end of the tongue 7 is attached to the tractor vehicle 23 as shown at 24.

In operation, and with the several described elements properly adjusted and tensioned, when the vehicle 3 is going down grade, it is apparent that the weight of the vehicle 3 crowding forwardly against the relative inertia of the vehicle 23, will cause the tongue 7 to be thrust backwardly, thereby automatically tightening the cable 20 and the brakes 22. The spring 15 serves as a shock absorber against the too sudden forward thrust of the collar 2.

While we have herein described a certain specific manner and method of constructing and assembling the elements of our invention, it is understood that we may vary from the same in minor details, not departing from the spirit of our invention, so as best to construct a practical device for the purpose intended, as defined in the appended claims.

We claim:

1. In a device of the kind described, a trailer vehicle chassis including alined front and rear tongue sleeves, a tongue slidably passed through said sleeves, a pull collar mounted on the tongue adapted to engage the front sleeve, lateral wings on the pull collar slidably engaging the hounds of the chassis, a shock collar mounted on the tongue forwardly of the front sleeve, shock absorbing means between said shock collar and front sleeve, a brake collar mounted on the tongue and operatively connected to the brakes of the vehicle, and means for adjusting said pull collar and brake collar on said tongue.

2. In a device of the kind described, a trailer vehicle chassis including front and rear tongue sleeves disposed upon the longitudinal center line of the chassis, the front tongue sleeve forming a junction for the forward ends of the hounds of the chassis, a tongue slidably passed through said tongue sleeves, the front end of the tongue having means for coupling the same to a tractor vehicle, a pull collar adjustably mounted on said tongue rearwardly of the front sleeve, lateral wings on said pull collar slidably engaging said hounds, a shock collar secured to said tongue forwardly of said front sleeve, shock absorbing means between said shock collar and front sleeve, a brake collar adjustably mounted on the tongue rearwardly of said pull collar, and means connecting said brake collar to the brake mechanism of the trailer mechanism.

3. In a device of the kind described, a trailer vehicle chassis including front and rear tongue sleeves disposed in longitudinal alinement upon the hounds of the chassis, said sleeves being arranged upon the longitudinal center line of the chassis as a whole, a cross bar connecting the rearward portions of said hounds, said rear tongue sleeve being secured to said cross bar, the front tongue sleeve forming a junction for the forward ends of said hounds, a tongue slidably passed through said sleeves, the front end of the tongue extending forwardly of the front collar and having means for coupling the tongue to a tractor vehicle, said tongue having a plurality of vertical apertures along its longitudinal center line, a pull collar adjustably mounted on said tongue rearwardly of the front sleeve, means engaging any one of said apertures for locking said pull collar on said tongue, lateral wings on said pull collar slidably engaging said hounds, a shock collar secured to said tongue forwardly of said front sleeve, a coiled spring on said tongue between said shock collar and said front sleeve, a brake collar adjustably mounted on said tongue rearwardly of said pull collar, means engaging any one of said apertures for locking said brake collar on said tongue, and means for connecting said brake collar to the brake mechanism of the trailer vehicle.

In testimony whereof we affix our signatures.

WILLIAM O. SWANSON.
WILLIAM F. SWANSON.